June 16, 1925. 1,542,562
T. LEVOZ
FURNACE FOR MELTING AND TREATING ORES AND METALS GENERALLY
Filed April 15, 1924 2 Sheets-Sheet 1
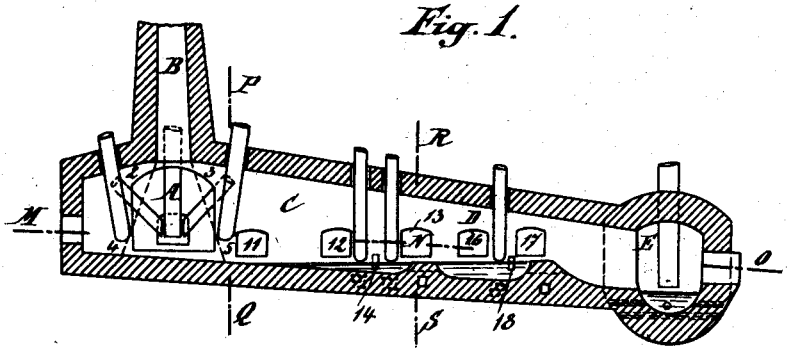
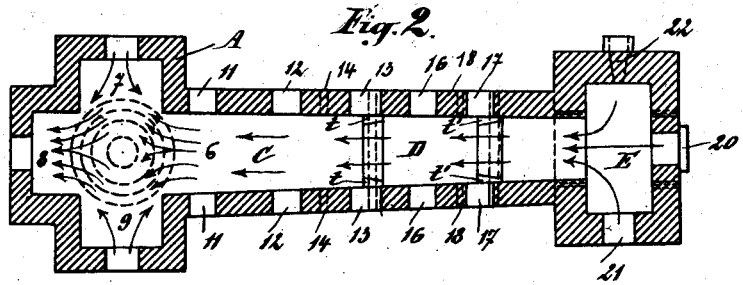
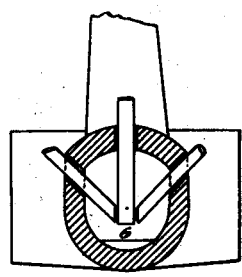 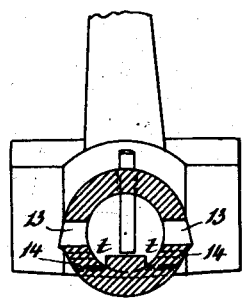
Toussaint Levoz
INVENTOR
by
his Attorney Toussaint Levoz
INVENTOR Patented June 16, 1925.

1,542,562

UNITED STATES PATENT OFFICE.

TOUSSAINT LEVOZ, OF HEER, BELGIUM.

FURNACE FOR MELTING AND TREATING ORES AND METALS GENERALLY.

Application filed April 15, 1924. Serial No. 706,649.

*To all whom it may concern:*

Be it known that I, TOUSSAINT LEVOZ, subject of Belgium, residing at Heer, Province de Namur, Belgium, have invented certain new and useful Improvements in Furnaces for Melting and Treating Ores and Metals Generally, of which the following is a specification.

The blast furnace and the cupola alone have continuous operation amongst all apparatuses that are employed in metallurgy. In all the other apparatuses, whether Martin furnaces, converters and others, the operations are alternating, in the sense that they always comprise the same succession of operations namely, the introduction of the charge, the treatment of said charge, and the tapping or pouring out of the molten metal; then again introduction of the charge, treatment of said charge and pouring of the molten metal, and so on. It will be readily understood that a furnace working in continuous operation is highly desirable in metallurgy, for the reason that it would simplify every kind of manufacture, and would necessarily be accompanied by an economy in its installation, an economy in the amount of heat consumed, a saving in raw materials, and especially a saving in labour.

The improved universal furnace forming the subject of the present invention can be worked in an absolutely continuous manner; it is likewise applicable to the treatment of metals generally and to the direct fusion of ores.

The improved furnace consists essentially in a melting furnace of peculiar form followed by three chambers or laboratories, which may, if required, be suitably combined so as to allow of effecting therein successively and uninterruptedly the discharge of the fusion slag in the first chamber, the additions of the reducing agents or fluxes in the second chamber for the purpose of producing the slag required for the first refining operation, and finally in the following chamber or chambers, the continuation of the refining operation and the finishing-off of the metal by additions of ferro-manganese, ferro-silicon or other substances that are necessary for assuring the reduction of the iron oxides.

An embodiment of this invention is illustrated by way of example in the accompanying drawings in which:—

Figure 1 is a vertical axial longitudinal section of an improved furnace, comprising in addition to the melting furnace proper, three chambers or laboratories.

Figure 2 is a horizontal section taken along the line M—N—O of Figure 1.

Figure 3 is a vertical section taken along the line P—Q of Figure 1, and

Figure 4 is a vertical section taken along the line R—S of Figure 1.

Figure 5:
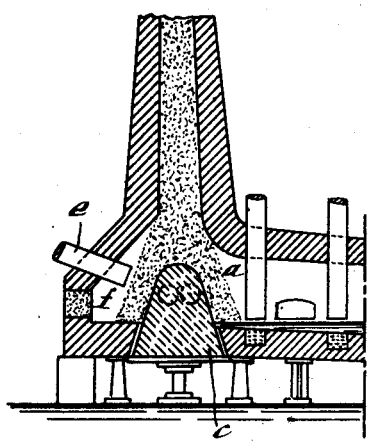
Fig. 5 is a sectional view of my improved furnace showing a charge in place.

In the illustrated example: A is the melting furnace proper surmounted by a hopper B; C, D, E, are the three laboratory chambers fitted with working doors and inspection doors, and tapping holes for the passage of the materials under treatment, the tapping of the slag and cinder, and the final tapping of the finished metal.

The melting furnace A constitutes one of the characteristic features of the improved furnace. It is designed in such a manner as to allow of charging the materials to be melted in the form of a determined truncated cone, proportioned to the quantities to be treated, and indicated in the drawings by 2, 3, 4, 5, said cone being heated by radiation from the heating chambers 6, 7, 8, 9 which surround it.

Contrary to what takes place in the Swedish electric shaft furnaces, said cone is thus heated from the outside towards the inside by the radiation from the heating chambers that surround it on all sides. These chambers are heated in their turn either electrically by the electric arc, or by any other suitable thermal means, such as burners burning gas, heavy oils, powdered coal and other fuels. It would be readily perceived that the use of such large surfaces for heating, will ensure a rapid melting of the materials for a thickness which may be the greater the greater the size of the said chambers.

As the melted materials flow over the inclined hearth towards the first laboratory chamber C, the cone will reform of itself, presenting to the radiated heat fresh materials that have already been raised to high temperatures by the mere conduction of the heat generated in the middle of its mass. The melted products having commenced to flow into the laboratory chamber C, the fusion slag is then discharged (as in the blast furnace or cupola) through holes 14 provided for this purpose.

Before the first laboratory chamber has become filled with metal, the reducing agents and fluxes necessary for producing the slag required for the first refining operation will have been prepared on the hearth of the second laboratory chamber D. The working doors 16, 17 provided at the sides will allow of effecting these operations with ease, and also of inspecting the linings.

The first laboratory chamber being filled with metal free from fusion slag which has been discharged as above stated, the said metal is now run into the second laboratory chamber D through tapping holes $t$, $t$ provided at the sides for this purpose, which are unstopped at the desired moment through the side doors 13. The slag that has been formed previously in the laboratory chamber D acts very quickly, and the metal, which is refined for the greater part, may be run through holes $t'$, $t'$ into the third laboratory chamber E, in the same way as it has been previously run from the first chamber into the second chamber.

The refining of the metal is continued in the said third chamber and the metal is finished therein. The slag is discharged through the two doors 20 and 21 provided for this purpose. The necessary additions of ferro-manganese, ferro-silicon and the like are made so as to obtain the desired quality of the metal, and then the metal is run into the ladle through the tapping hole 22 provided at the end of the laboratory chamber.

The three laboratory chambers C, D, E of which two have inclined hearths, are heated electrically in the illustrated example. The section P—Q (Fig. 3) shows a portion heated by the electric arc. The section R—S (Fig. 4) shows a portion heated by the electrical arc and by electric resistance. All other suitable heating means, such as suitable burners suitably located, may however be employed in practice according to the circumstances of the case.

The flames circulate in the laboratory chambers according to the directions of the arrows shown in Figure 2 they impinge upon the cone and encircle it, being drawn by the chimney draught into the regenerating chambers which they heat very intensely so that the injection air for feeding the burners can be raised to a temperature of at least 1000° C. The regeneration of the gases by the charging hopper serves to supply additional heat to the regenerating chambers.

It is to be understood that if any one of the refining operations takes a longer time than the intended period, it is an easy matter to slacken the speed of the fusion, and even to stop it without any drawback, and especially without the fear of cooling down the general interior of the furnace which has been raised to a temperature which should be rather higher than is absolutely necessary, and which temperature it will retain for a period sufficient for the performance of all the operations with a successful result.

The linings of the hoppers and the heating chambers and the laboratory chambers must consist of refractory materials adapted to the purposes for which the installations are intended. In order to facilitate the stopping and unstopping of the tap-holes $t$, $t$ and $t'$, $t'$ respectively, these holes may be located in refractory bridges provided for the purpose of sheltering the operator from the heat reflection of the bath The foregoing description which is based on the accompanying drawings is particularly applicable to an installation consisting of a melting furnace proper followed by three laboratory chambers. This number of laboratory chambers will necessarily vary in practice. Thus, if it is required to effect de-phosphorization and de-sulphurization, it will be necessary to interpose two supplementary laboratory chambers in front of the final laboratory chamber for finishing the metal. As a matter of fact the improved universal furnace allows of treating practically every kind of metal bath.

It can be employed with advantage in the manufacture of all ferro-alloys, and especially those which it is desired shall be free from carbon, and which have not been able to be manufactured economically hitherto by known means. The carbides of calcium may also be manufactured more economically, because the improved universal furnace allows of regenerating the gases and the heat that are generally lost in present-day furnaces.

As already above stated the improved continuous furnace of this invention is also applicable to the direct treatment of ores. It can be used with advantage especially for carrying into effect the direct process for reducing iron ores, described in my earlier application for patent dated February 16th, 1924, and numbered 693,359.

Figure 6:
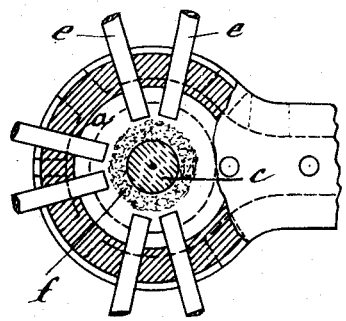
Figure 6 is a transverse sectional view of the same.
Figure 7:
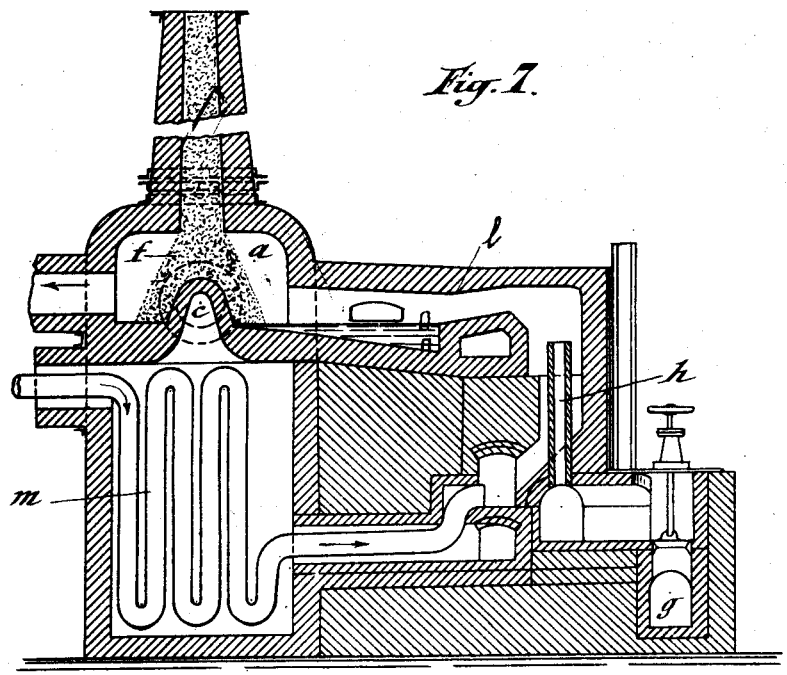
Figure 7 is a vertical sectional view of my improved furnace showing a modified chamber.

In such a case it is particularly advantageous to apply to the construction of the melting furnace, the modified arrangement illustrated in Figures 5, 6 and 7 of the accompanying drawings. This arrangement consists essentially in providing the central portion of the hearth of the furnace with a cone having a rounded top, and a height approximately equal to two-thirds of the height of the actual furnace, for the purpose of assuring an equal distribution of the ore coming from the charging hopper, reducing the thickness of the layer of ore, effecting thereby a more rapid melting of the ore, preventing at the same time the molten metal from becoming solid again on contact with the hearth, and ensuring finally an appreciable saving in the heat consumption.

The improved arrangement is also applicable to heating by electricity, to heating by gas and other suitable kinds of heating, as illustrated in the accompanying drawings which illustrated by way of example two constructional forms of the improved arrangement applied respectively to heating by electricity and to heating by gas.

Figures 5 and 6 relate to the first case. They show a melting furnace which is heated electrically by the electric arc and by electric resistance.

$a$ is the melting chamber proper; $c$ is a cone of the refractory material furnished with poles for leading in the current, located opposite pairs of electrodes $e$ which supply the electric current over the entire periphery of the furnace, so that the current will act uniformly upon the layer of ore $f$, by electric arcs and electric resistance, this latter being produced by the metal itself. It will be readily perceived that the refractory cone contributes by contact and radiation to accelerate the melting of the ore surrounding it. The molten metal passes from the melting furnace into the adjacent laboratory chamber without any risk of its becoming solidified again.

Figure 7, which is given here solely for illustrating the application of the same arrangement to a melting furnace heated by gas, represents a melting furnace combined with a single working or laboratory furnace for producing cast iron. The cone $c$ has the same function here as in the case of the electric furnace. As shown in Figure 7 the gases coming from the gas producer through the chamber $g$, pass through a suitable pipe $h$ at the end of which they are mixed with the air for combustion. The hot gases, after having heated in succession the laboratory chamber $l$ and the melting furnace $a$, are then discharged on their way to a regenerator $m$ in which they are utilized for heating cold air.

Whatever may be the constructional arrangement that is employed, the operations will take place as follows: The fluxes, reducing agents and ores to be treated are first well crushed, then agglomerated in the form of briquettes dimensioned to suit the size of the melting furnace, and preferably hollow in order to promote the discharge of the gases, whilst increasing the surfaces exposed to the action of the heat.

Under the influence of the low-temperature fluxes, the gangues are softened rapidly over the entire surface of the cone. The oxides of the ore which are disclosed are readily reduced by intimate contact with the reducing agents, and the slightly carburized iron will become liquid and will flow together with the slag on to the inclined hearth, on its way to the first laboratory chamber C in which the carburized iron will become distinctly separated from the slag that floats on the top of it. The intimate contact of a quantity of slag (about $2/3$ for $1/3$ of carburized iron) during the flow over the inclined hearth) will have sufficed to provoke the dissociation of the silicate of alumina, and obtaining alumina which will be reduced to aluminium by the carbon of the carburized iron. The metal accumulated in the first laboratory chamber will therefore be an alloy of iron, silicon, manganese and aluminium, and the fusion slags which might be, if anything, injurious in the further course of the treatment, will be discharged as they are formed through the holes 14 provided in the side walls.

Whilst the metal is rising in the laboratory chamber C, there will have been introduced on to the hearth of the second laboratory chamber D, hematite ore, magnetite or hammer scale, lime and low-temperature fluxes, which under the influence of the general temperature of the furnace (1600 to 1700° C.) will enter into fuse towards 1300 to 1400° C. so as to form perfectly liquid slag.

When the first laboratory chamber is full of metal, the tapping holes $t$, $t$ are unstopped to allow the metal to flow into the second laboratory chamber D containing extra-basic fusible slag.

Since the metal does not contain carbon any longer, the reactions are steady and since they are all of the exothermic order, there will be produced immediately in the very midst of the bath of the ferrous alloy, extremely high temperatures that will assure a rapid refining. The slag will be discharged through the holes 18 at the same rate as the metal rises in the laboratory chamber D. When the laboratory chamber C is about almost empty, the tapping holes $t$, $t$ will be stopped again, in order to begin a fresh operation. Meanwhile slag approximately similar to the slag formed in the second laboratory chamber, will have been prepared in the third laboratory chamber E. The said second laboratory chamber having been filled with metal, the slag holes 18 are stopped, whilst the side tapping holes $t'$ $t'$ are unstopped in order to allow the metal to flow into the laboratory chamber E.

When it is necessary to effect de-phosphorization, it will be necessary to provide in this case also an intermediate laboratory chamber containing an extra-basic slag previously melted and adapted for de-phosphorization. The same measure applies for effecting de-sulphurization. It is only after purification that the bath can be introduced into the final laboratory chamber E.

In this last laboratory chamber the reactions are almost nil, and it is probable that in practice, de-oxidizing slag may be formed instead of extra-basic oxidizing slag. As in the first two laboratory chambers, the slag will be discharged as it is being formed, and when the level of the bath shall have reached a certain height, the additions of ferro-alloys will be made which are necessary for the production of the final metal which it is desired to produce.

The finished metal produced in the laboratory chamber E will be run, in the usual manner, into a casting ladle for distribution into ingot moulds or into ordinary moulds.

In the application of the furnace hereinbefore described, the linings of the hopper, the radiating heating chambers, the inclined hearth and the first laboratory chamber C are made of silico-aluminous materials, containing rather more alumina than silica, or better still containing chromides, for the purpose of better resisting the actions of slag containing silicates and especially alumina. The cubic shape given to the briquettes and the hollows provided in the latter, will facilitate the discharge of the gases charged with alkaline dust which might have a detrimental effect upon the linings.

The operations that take place in the laboratory chambers D and E are mainly of basic nature, and therefore their linings are preferably composed of basic materials (dolomite or magnesia). As will be readily perceived the improved universal furnace as hereinbefore described is characterized clearly by the possibility of effecting the continuous fusion of the ores and metals without the fear of the occurrence of contact with coke liable to carburize and sulphurize the molten materials. In this manner, purer metals will be obtained without risk of their becoming oxidized, because the added heat takes place in a reducing medium assured by the high temperature of the injection air, this temperature being itself assured by the judicious regeneration of the heat generated simultaneously by the large heating surfaces of the heat radiating chambers, the cone and the gases of the hopper.

The regenerating chambers that follow immediately on the gas and heat exit, are located below the furnace throughout the length of the latter so that the air issuing in proximity to the burners of the lower laboratory chamber will be raised to the maximum temperature.

What I claim is:—

1. In a continuous-operation metallurgical furnace for melting and treating ores and metals generally, the combination comprising a melting furnace surmounted by a charging hopper, in which the materials to be melted have the form of a truncated cone proportioned to the capacity of the work of the installation and to the heating capacity of the heating chambers located in the side walls of the furnace, the flames from which surround completely the cone of the materials which are thus heated by radiation, said furnace being continued by an inclined hearth which assures the discharge of the melted materials towards a series of three laboratory chambers, or a plurality thereof, adapted to be placed into communication with one another through suitable tapping holes, said laboratory chambers being provided each with inspection and working doors and also with discharging holes for the slag and cinder, and being combined together in such a manner as to permit of effecting therein successively and interruptedly, in the first of said chambers the discharge of the fusion slag floating on the top of the metal, in the second of said chambers, the addition of reducing agents and fluxes for producing the slag required for the first refining operation to be performed therein, and finally in the last of said chambers the continuation of the refining process and the finishing of the metal by additions of ferromanganese, ferro-silicon and the like substances according to the nature of the metal to be produced.

2. In a continuous-operation metallurgical furnace for melting and treating ores and metals generally, as specified in claim 1, the further combination therewith of the de-phosphorizing and de-sulphurizing chambers located in front of the final laboratory chamber for finishing the metal.

3. In a continuous-operation metallurgical furnace for melting and treating ores and metals generally, as specified in claim 1, the further combination of a refractory cone having a rounded top, located at the central portion of the hearth of the melting furnace, whereby the ore in course of being melted is distributed uniformly around said cone, for the purpose, of assuring a uniform distribution of the ore coming from the charging hopper, determining the thickness of the layer of said ore, effecting a more rapid melting of the ore, preventing the molten metal from solidifying again by contact with the hearth, and assuring an appreciable saving in the consumption of heat.

4. In an electrically heated melting furnace, the combination of a refractory cone having a rounded top, located at the central portion of the hearth of the melting furnace, whereby the ore in course of being melted is distributed uniformly around said cone, pairs of electrodes for heating said melting furnace by electric arcs and electric resistances, and poles for the return of the electric current located respectively facing said pairs of electrodes, and located in said cone of refractory material.

In testimony whereof I affix my signature.

TOUSSAINT LEVOZ.

Witnesses:
 SIM. GOFFEN,
 J. P. GREENE.